United States Patent

[11] 3,601,149

[72] Inventor Samuel E. Gilmore
P.O. Box 265 Bellaire, Houston, Tex. 77401
[21] Appl. No. 859,121
[22] Filed Sept. 18, 1969
[45] Patented Aug. 24, 1971

[54] RELIEF VALVE
12 Claims, 16 Drawing Figs.
[52] U.S. Cl. .................................................. 137/494,
137/625.65
[51] Int. Cl. .................................................. F16k 31/36
F16k 31/12
[50] Field of Search .......................................... 137/494
505, 505.18, 505.13;
251/282, 328, 175

[56] References Cited
UNITED STATES PATENTS
| 463,260 | 11/1891 | Frew | 251/175 |
|---|---|---|---|
| 2,000,822 | 5/1935 | Clarke | 137/625.68 |
| 2,959,189 | 11/1960 | Natho | 137/625.65 |
| 3,329,168 | 7/1967 | Vollmer | 251/175 X |
| 3,432,141 | 3/1969 | Irti et al. | 251/282 X |
| 3,457,957 | 7/1969 | Mueller | 251/282 X |

Primary Examiner—Alan Coran
Assistant Examiner—Robert J. Miller
Attorneys—Murray Robinson, Ned L. Conley, Robert W. B. Dickerson and Bill B. Berryhill ABSTRACT: Valve closure means comprises conduit means movable in valve body between a closed position against a stop and an open position away from stop. Stem connected to conduit means extends through body to a spring that urges conduit means to closed position. Upstream pressure from inlet port in valve body is effective over cross-sectional area of stem to urge conduit means to open position. Valve opens when upstream pressure overcomes spring force. Conduit means has passage therethrough in which are telescoped tubes sealingly bridging between valve body and conduit means. In closed position of valve closure one tube surrounds outlet in valve body whereby outlet is sealed off from interior of valve body except over parallel area where other tube contacts valve body. The latter area is provided with a blank seat or a blind second seat to seal with tube. Therefore, downstream pressure acting on closure is balanced as far as components in direction parallel to plane of valve seat is concerned. Inner diameter of tubes where they engage carrier. Therefore, downstream pressure acting on closure is balanced as far as components acting in direction perpendicular to plane of valve seat is concerned. With the construction downstream pressure creates no friction force between closure and body and upstream pressure at which valve opens is independent of downstream pressure. Valve body has alternative outlet port beneath blank seat or blind second seat. Effective are of tubes subject to upstream pressure is such as to cause tubes to seal more tightly against seat means as upstream pressure increases so long as valve is in closed position.

Samuel E. Gilmore
INVENTOR.

BY Murray Robinson
ATTORNEY

Samuel E. Gilmore
INVENTOR.

BY Murray Robinson
ATTORNEY

RELIEF VALVE

BACKGROUND OF INVENTION

1. Field of Invention

This invention pertains to pressure relief valves and more especially to such a valve used to vent excess vapor pressure above liquid hydrocarbons.

2. Description of Prior Art

A conventional valve includes a hollow body having an inlet and an outlet with a closure member therebetween cooperable with a seat carried by the body to separate the inlet from the outlet when the valve is in closed position, the valve being open when the closure moves away from the seat uncovering the passage therethrough. The seat and closure may be at the valve inlet or outlet or anywhere in between. The closure may reciprocate toward and away from the plane of the valve seat, as in a poppet valve, or move parallel to the valve seat, as in a gate valve.

The usual pressure relief valve is of the poppet type. The closure is positioned on the downstream side of the seat passage so that upstream pressure tends to move the closure off the seat to open the valve. A spring connected to the closure urges the closure toward its seat. The downstream pressure also urges the closure toward its seat. The upstream pressure must overcome the spring force plus the force due to the downstream pressure in order for the valve to open. As the upstream pressure approaches that required to open the valve the force holding the closure against its seat approaches zero and the valve tends to leak. If the downstream pressure, sometimes called the back pressure, is variable, the upstream pressure at which the valve opens also is variable.

In the usual gate valve, the friction between the closure and seat varies with the difference between the upstream and downstream pressure acting on the closure.

SUMMARY OF THE INVENTION

According to the invention the problems associated with poppet-type pressure relief valves, namely leakage when upstream pressure approaches that required to open the valve, and variation of upstream pressure required to open the valve dependent on the amount of back pressure, are overcome by so constructing the valve that increase of upstream pressure makes the valve seal more tightly as long as the valve is closed, and the forces due to back pressure do not affect the upstream pressure at which the valve opens. To that end the dual functions of blocking off the passage through the valve seat passage and responding to upstream pressure performed by the usual valve disc or poppet disposed on the downstream side of the valve seat are divided in two. The first function is performed by a tubular valve closure means on the upstream side of the seat, said closure means extending between the seat and the opposite side of the valve body. The second function is performed by a valve actuating stem extending through the valve body on the upstream side of the seat, the stem being subjected to the differential between upstream pressure and the pressure external to the valve. By this division, the valve actuator is responsive to upstream pressure alone and the downstream pressure acting on the valve closure exerts no net force tending to open or close the valve or resist such motion.

To effect a seal the tubular closure means includes telescopic seal tubes slidably mounted in a passage through a carrier, herein referred to as a conduit means, and sealed thereto by O-rings, the seal tubes being urged by a spring, and also by upstream pressure, into engagement with the seat and the valve body (or a blank or blind seat). The effective area of each tube subject to upstream pressure is such that increase in upstream pressure, short of the pressure at which the valve is set to open, causes the tube to seal more tightly. To balance out the effect of downstream pressure on the seal tubes, the inner diameter of each tube where it engages the seat or valve body equals the outer diameter of the seal tube where it engages the carrier.

The tubular closure is moved transversely across the seat to open the passage therethrough, rather than perpendicular to the plane of the seat as in the usual poppet valve. The valve stem axis is therefore perpendicular to the valve seat plane. If the attempt were made to reciprocate one of the seal tubes off the seat instead of moving it laterally out of register with the seat passage, the connection between the valve stem and closure would become complicated, although such alternative would still have the advantages of the pressure balanced valve closure of the invention.

Other features of the invention and advantages thereof will become apparent from the following description of a preferred embodiment, reference being made to the accompanying drawings, but it is to be understood that this embodiment is merely illustrative and does not limit the scope of the invention.

BRIEF DESCRIPTION OF THE DRAWINGS

FIGS. 9A and 10A are views similar to FIGS. 9 and 10 showing a modification.

DESCRIPTION OF PREFERRED EMBODIMENTS

Figure 1:
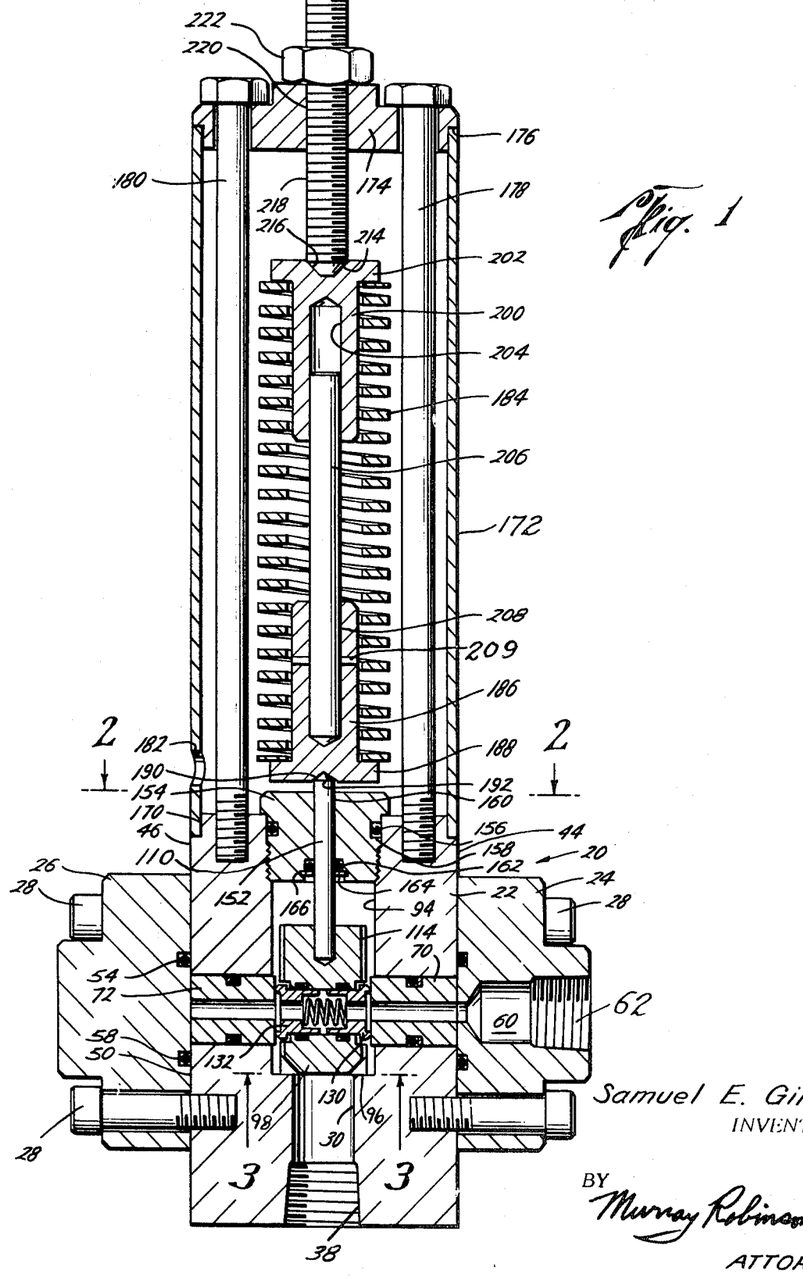
FIG. 1 is a vertical section through a relief valve embodying the invention showing the valve in closed position.
Figure 1A:
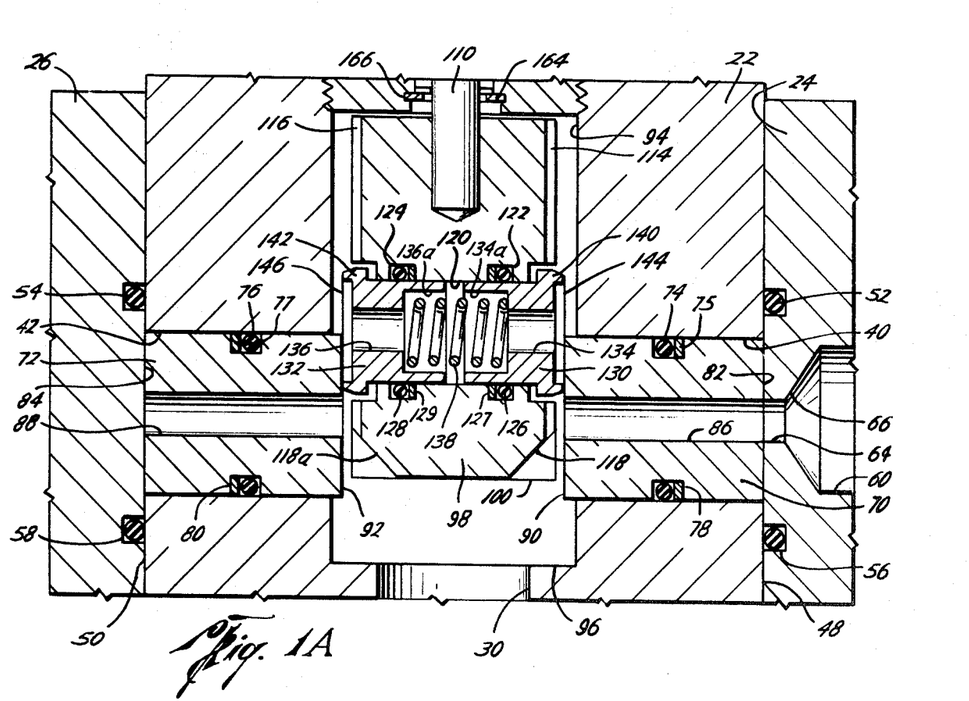
FIG. 1A is an enlargement of the closure means portion of the valve shown in FIG. 1, showing same in open position.

Referring now to FIGS. 1 and 1A there is shown a pressure relief valve including a hollow body 20 including a main portion 22 and outer portions 24, 26 secured thereto by screws 28. The main portion of the body has a generally cylindrical inlet 30 at one end, the outer extremity of which is threaded at 38 to connect to an inlet pipe (not shown). The main portion of the body also has two coaxial, equal diameter, cylindric holes 40, 42 in its sides, the axes of the holes being perpendicular to the axis of said inlet.

Figure 2:
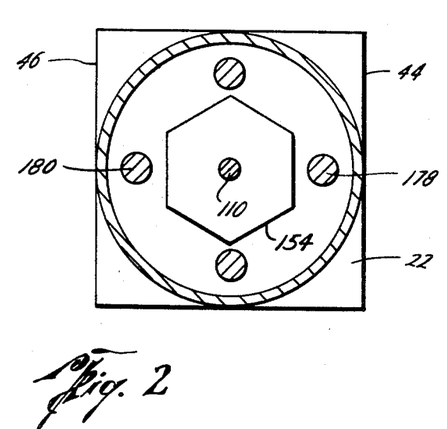
FIGS. 2 and 3 are horizontal sections taken at planes 2—2 and 3—3 of FIG. 1.

Referring now also to FIG. 2 the main portion 22 of the body is of square cross section providing parallel planar side surfaces 44, 46 against which in sealing engagement lie the planar surfaces 48, 50 of the outer portion of the body. O-rings 52, 54 received in annular grooves 56, 58 in the surfaces 48, 50 of the outer portions of the body ensure a seal between the main portion of the body and the outer portions of the body.

One of the outer portions, 24, of the body is provided with generally cylindric valve outlet 60, the outer end 62 thereof being threaded to make connection with a discharge pipe (not shown). The inner end 64 of the outlet is of smaller diameter than the rest of the outlet, with transition portion 66 of gradually changing diameter therebetween.

The other outer portion, 26, of the body is the same as the first described outer portion 24 except that it is blank, there being no outlet therethrough. The two outer portions 24, 26, can be interchanged by the user, e.g., to suit convenience of connecting the discharge pipe to the valve or for other reason. If desired, both outer portions could include outlets.

Within each cylindrical hole 40, 42 in the main body portion is reciprocatingly, sealingly disposed seat means in the form of a generally cylindrical plug as shown at 70, 72. O-rings 74, 76, together with backup washers 75, 77, are received in annular grooves 78, 80, around the plugs and seal between the plugs and the main portion of the valve body. The outer ends 82, 84, of the plugs are planar and abut against the other planar surfaces 48, 50, respectively, of the outer portions of the valve body. Each seat means has an axial port 86, 88 therethrough, the ports being coaxial and of equal diameter and port 86 being coaxial with and of equal diameter to the inner small diameter portion 64 of the outlet 60. The inner ends of the plugs 70, 72 protrude into the cylindrical bore 94 forming the inner surface of the hollow valve body. The said inner ends have parallel planar surfaces 90, 92.

The bore 94 is of larger diameter than the inlet 30, forming an inwardly facing shoulder 96 which provides a stop means. In valve closed position, as shown in FIG. 1, conduit means in the form of a carrier 98 has its lower end resting against shoulder 96, the lower end surface 100 of the conduit means being planar to engage planar shoulder 96.

Figure 3:
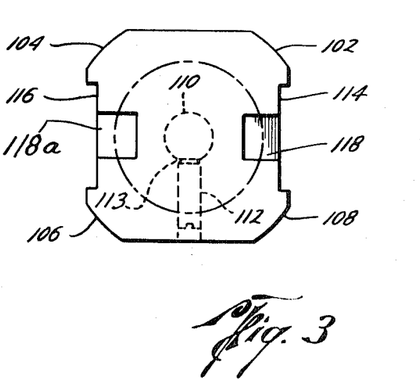

Referring also to FIG 3, the carrier or conduit means 98 is of generally square cross section with rounded corners 102, 104, 106, 108 adapted to be guided by the cylindrical surface of bore 94. Valve stem 110 is secured in conduit means 98 by a setscrew 112 engaging within recess 114 in the side of the stem. Flutes 114, 116 extend vertically down the sides of the conduit means along the centers of the sides. Chamfers 118, 118a on the lower edges of the conduit means overlap the inlet 30, whereby upstream fluid can enter bore 94 from inlet 30, passing up along the sides of the conduit means between the flat sides thereof and the cylindrical surface of bore 94. The fluid also enters flutes 114, 116 to actuate seal means next to be described.

The conduit means 98 has a cylindrical opening 120 therethrough, coaxial with openings 40, 42 of the valve body when the valve is in closed position as shown in FIG. 1. Thus, the ends of opening 120 face the planar inner end surfaces 90, 92 of the seat means plugs 70, 72. Annular grooves 122, 124, in opening 120 receive O-rings 126, 128 to seal with seal means tubes next to be described.

Reciprocatingly, sealingly, disposed in each end of opening 120 are seal means, in the form of generally cylindrical tubes 130, 132. The inner ends of the tubes are guided by opening 120 and sealed thereto by O-rings 126, 128, having backup rings 127, 129. Ports 134, 136 through the tubes are of equal diameter and coaxial with each other and with opening 120 and are of the same diameter as ports 86, 88 in the seat means plugs and are coaxial with the latter when the valve is in closed position. The inner ends of the seal means tubes are interiorly enlarged at 134a and 136a to form seats for the ends of compression helical spring 138. The spring 138 urges the seal means tubes outwardly against the seat means plugs. The outer end of each tube is enlarged as shown at 140, 142. The outer planar face of each tube is provided with an annular bead, as shown at 144, 146, the beads 144, 146 being concentric with the tubes. The free ends of the beads have planar faces where they sealingly engage the seat means plugs. The net effective area of each tube subject to upstream pressure when the valve is in closed position is such that upstream pressure acts in a direction to move the tubes toward the adjacent seat means plugs. Especially the area at the shoulder joining the enlarged end of each tube to the rest of the tube is subjected to pressure urging the tubes toward the plugs. The inner diameter of each bead is equal or substantially equal to the outer diameter of the tube where it engages the O-rings carried by the conduit means. Therefore, downstream pressure on each tube is balanced when the valve is in closed position, except for whatever pressure exists between the planar face of the seat means and the planar face of the bead engaged therewith. To allow for the latter pressure, the inner diameter of the beads may be made slightly smaller than the outer diameter of the tubes where they seal with the opening in said conduit means.

It will be observed that the downstream pressure on the valve closure means comprising the conduit means 98, seal means tubes 130, 132, spring 138, and O-rings 126, 128, acts equally in all directions parallel to the planar faces of the seat means plugs and over equal effective areas in all such directions so that the downstream pressure exerts no net force tending to move the closure means parallel to the faces of the seat means. In addition, since downstream pressure on the seat means tubes is balanced in the direction axially thereof, there is no variation in the friction force between beads 144, 146 and the planar faces of the valve seat plugs with variation in downstream pressure. Therefore opening and closing of the valve by movement of the closure means is independent of downstream pressure.

Upstream pressure acting on the closure means over the net area of valve stem 110 tends to open the valve, by moving the closure means to the open position shown in FIG. 1A. Until the upstream pressure increases to such a value as to overcome the spring means, next to be described, urging the conduit means against the stop means provided by shoulder 96, the valve remains in closed position as shown in FIG. 1. Until such value of the upstream pressure is reached, the seal means tubes are urged against the valve seat plugs with increasingly greater force as the upstream pressure increases, so that the valve seals tight at all times.

The bore 94 in the main portion of the valve body is threaded at 152 and receives a bonnet 154 which is screwed therein. O-ring 156 in annular groove 158 around bonnet 154 seals the bonnet to the main portion of the valve body. Stem 110 extends through a hole 160 in the bonnet. Packing 162 in a counterbore around the stem is held in place by split locking ring 164, the latter being received in groove 166. By that means the stem is sealed to the bonnet.

The upper end of the main portion of the valve body is rabbeted at 170 to receive cylindrical tubular housing 172. Circular disc 174 is rabbetted at 176 and fits inside housing 172 to close the upper end thereof. Screws 178, 180 hold the disc 174 and tube 172 to the main portion of the valve body. The housing is vented by port 182. Within housing 172 is a helical spring 184. Within the lower end of the spring is a plug 186 having a flange 188 receiving the lower end of the spring. Plug 186 has a tapered seat 190 receiving the tapered upper end 192 of the valve stem 110. Within the upper end of the spring is a plug 200 having a flange 202 bearing against the upper end of the spring. Plug 202 has a bore 204 reciprocatingly receiving a guide stem 206, the lower end of which is pressed into a bore 208 in plug 186 and is retained therein by pin 209. Plug 202 has a tapered seat 214 receiving the beveled end 216 of screw 218. Screw 218 extends through threaded opening 220 in disc 174 and is releasably held against rotation by lock nut 222. By screwing screw 218 in or out the degree of compression of spring 184 can be varied, thereby to set the upstream pressure at which the valve opens.

When the upstream pressure rises sufficiently to overcome the force exerted by spring 184, the conduit means 98 moves upwardly placing the closure means in the valve open position shown in FIG. 1A. At this time liquid or other fluid entering the valve inlet 30 freely enters bore 94 in the main portion of the valve body, travels up around the lower end of conduit means 98 and exits through port 86 in seat plug 70 and outlet 60 in outer portion of the valve body.

Figure 4:
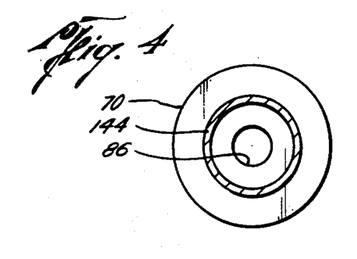
FIGS. 4–7 are a series of schematic views showing various relative positions of the FIG. 1 valve closure seal tube and the valve seat during operation of the valve.
Figure 5:
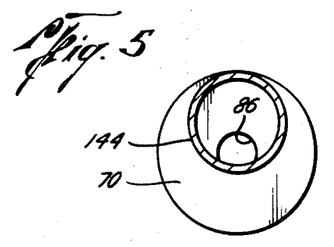
Figure 6:
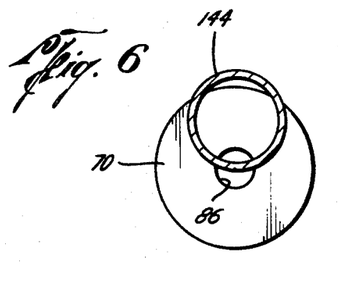
Figure 7:
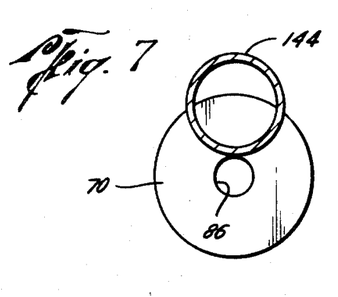

It will be understood that spring 184 is a long spring and is under considerable initial compression so that its compressive force will not increase greatly as the spring is further compressed upon opening of the valve. However, if the upstream pressure does not sufficiently exceed that needed to overcome the spring, the valve may not open all the way. In that event alternate flow paths through the valve are available. This will become apparent from FIGS. 4–7 which show the relative positions of the seat means plug and bead 144 of the seal means tube and port in the seat means plug at various degrees of valve opening. FIG. 4 shows the valve closed. FIG. 5 shows the valve just about to open. FIG. 6 shows the valve partly open. FIG. 7 shows the valve in full open position. It is apparent from FIG. 6 that as soon as the bead 144 moves off of the face of the seat means plug 70, liquid or fluid can enter the area inside bead 144 and travel across the planar face of plug 70 into port 86. This alternative path supplements the main path of flow through port 86 which occurs as soon as bead 144 passes over port 86. Depending on the diameters of the ports, either flow path may open first, preferably both open at the same time as shown. Eventually, when the bead 144 moves completely past port 86, as shown in FIG. 7, the alternate path over the seat plug face is cut off. Until such cut off, however, liquid or fluid can also flow to port 86 in seat plug 70 by traveling through the conduit means opening 120 from the area inside the bead 146 on the other seal means tube, entering such area both where the bead 146 overlies the recess formed by port 88 in seat means plug 72 and where the bead 146 has passed beyond plug 72. Especially with the valve only partially open, the flutes 114, 116 in the sides of the conduit means facilitate flow of fluid through the valve.

It will be noted that when the valve is in open position, as shown in FIG. 1A or the partially open position shown in FIG. 6, although the seal means tubes 130, 132 still are guided and supported at their inner ends by opening 120 in the conduit means, the beads 144, 146 no longer receive full support from the seat means plugs. If conditions are such that this is objectionable, e.g., tending to cause the seal means tubes to cant and bind in opening 120 or to scar the planar faces of the seat means plugs, the modified construction shown in FIGS. 8–12 can be used. The construction shown in FIG. 8 is the same as that shown in FIG. 1 except in those respects discussed hereinafter.

Figures 8, 13:
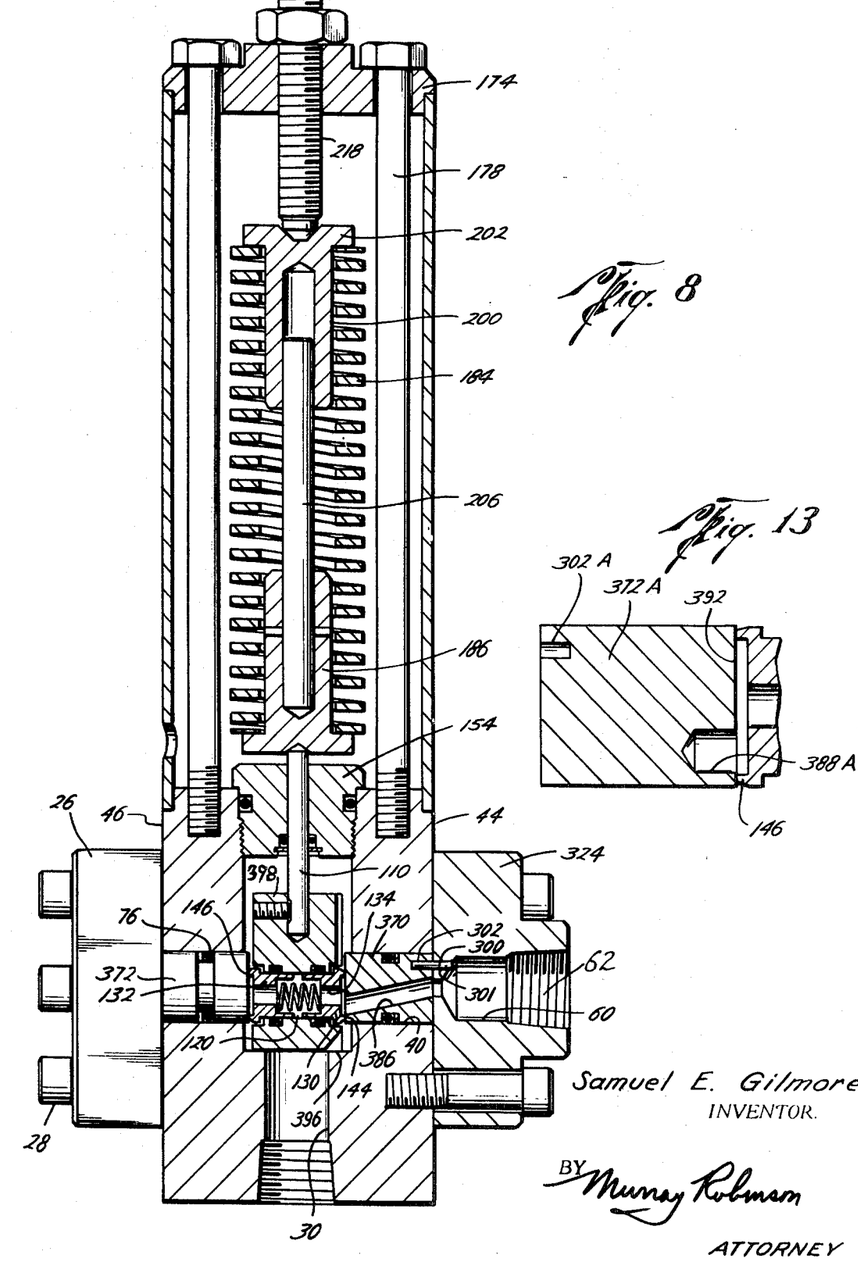
FIG. 8 is a view similar to FIG. 1 showing a modification.
FIG. 13 is a vertical section through a blind seat means plug according to a modified form of the invention.
Figure 9:
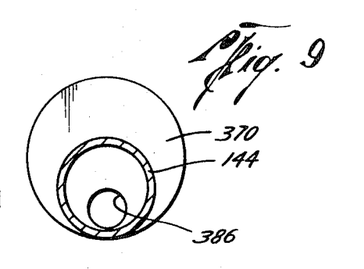
FIGS. 9–12 are a series of schematic views showing various relative positions of the FIG. 8 valve closure seal tube and the valve seat and body blank during operation of the valve.
Figure 10:
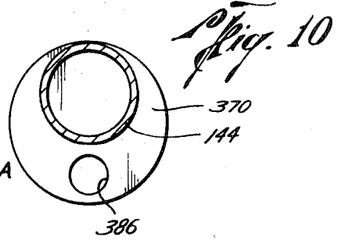

Referring to FIG. 8, the port 386 in the seat means plug 370 adjacent outlet 60 lies at an angle to the axis of the plug. The plug is positioned azimuthally in opening 40 by means of pin 300 extending through a hole 301 in the outer portion of the valve body and into socket 302 in the seat means plug. As so positioned the port 386 is angled toward the lower part of the valve, considering that an upward motion of the conduit means is required to open the valve. The stop shoulder 396 is positioned so that in the valve closed position shown in FIG. 8 the bead 144 sn the seal means tube is quite close, e.g., nearly tangent, to the lower edge of seat means plug 370 so as to allow a maximum amount of travel without the bead leaving the face of the seat means plug. This disposition is shown in FIG. 9. The inner end of port 386 in the seat means plug need not be concentric with bead 194 sr port 134 in the seal ring tube so long as it is surrounded by bead 144 in valve closed position, and a nonconcentric disposition is shown in FIG. 8 with the port 386 as low as possible, e.g., substantially tangent to bead 144. With this disposition of parts the valve can move to open position, as shown in FIG. 10, without the bead 144 ever heaving the face of the valve seat plug and with a minimum of travel. Valve travel from full closed position shown in FIG. 9 to full open position shown in FIG. 10 is equal to the diameter of port 346 plus half the difference between the outer and inner diameter of the bead, i.e., the thickness of the bead.

If there is no objection to the bead moving partially off the seat means plug when the valve is in partially open or full open position, the relative diameters of the seal means and seat means can be adjusted so that, similar to the FIG. 1 construction, the bead moves off the upper edge of the seat means at the same time it moves over the lower edge of the port in the seat means, thereby to increase the size of the available flow path for any given amount of initial opening of the valve. Such construction is illustrated in FIGS. 9A and 10A, FIG. 9A showing the valve in closed position with the bead 144A concentric with the face of seat means plug 370A and of almost as large a diameter, the bead just fitting between the lower edge outer periphery of the seat means plug and the eccentric end of port 386 in the seat means plug.

Figure 9A:
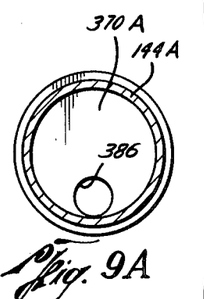
Figure 11:
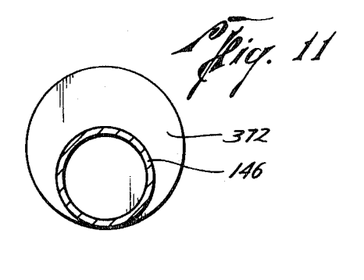
Figure 12:
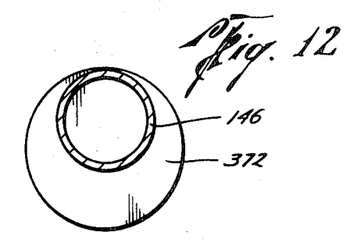

Unless it is desired to flow fluid through the conduit means when the valve opens, as in the FIGS. 1–7 constructions, and as can be achieved with the FIG. 9A and 10A construction, the plug adjacent the blind outer portion 26 of the valve body can be blank as shown at 372 in FIGS 8, 11, and 12. The relative positions of seat means plug 372 and the seal means bead 146 are shown in valve closed position in FIG. 11 and full open position in FIG. 12. Use of a blank seat means plug eliminates the cost of boring the plug and eliminates the need for sealing both the plug and the blank outer valve portion 26 to the main body portion, only one seal, e.g., as shown at 76 being required, although the seal 54 between the outer valve portion 26 and the main body portion can be retained if desired.

The same advantage, elimination of the need for two seals, can be obtained if the seat means plug 372 is merely recessed, instead of having a through port. Such a blind seat means plug 372A is shown in FIG. 13. In the FIG. 13 construction, the O-ring groove around the seat ring plug has been omitted, it being intended that reliance will be placed for sealing on the O-ring between the outer valve portion 26 and the main body portion, as shown in FIG. 1. In the FIG. 13 construction, a blind port 388A is provided in the lower part of the planar face 392 at the end of the seat means plug where it is to engage the bead 146. To maintain the azimuthal position of the plug 372A relative to the valve body it is provided with an alignment socket 302A similar to socket 302 and adapted similarly to receive an alignment pinlike pin 300, extending from a socket in outer portion 26 of the valve body analogous to socket 301 in the outer portion 324 of the valve body. With this construction, the relative positions of the port 388A and bead 146 in valve closed and valve part-open positions will be the same as shown in FIGS. 9A and 10A for the port 386 and bead 144A. The result will be that in partially open position of the valve there will be flow over the face of valve seat plug 322 and thence through the port 388A at both the upper and lower edges thereof into the port in seal means tube 132, through opening 120 in the conduit means, port 134 in the seal means tube 130, port 386 in the seat means plug 320 and thence to the outlet 60. This will be in addition to the flow over the face of valve seat plug 370 and either directly into port 386 at the lower part thereof or into the area of the seal means tube inside bead 144A and thence into port 386 at the upper part thereof.

Other configurations of the seat means and seal means and their ports and beads and other relative diameters of same can be used to achieve variations in the flow paths when the valve opens. At the same time the seal means tubes can be so shaped that downstream pressures thereon are substantially balanced and upstream pressure tends to move them against the seat means with such force as will effect a seal until upstream pressure on the closure means over the area of the valve stem overcomes the spring and moves the closure means to open the valve.

With reference to the relative diameters of the opening 120 and the outer periphery of the seal means tubes, sometimes hereinafter called seal means members, it may be added that the opening 120 may be relieved slightly between the O-ring groove and the enlarged end of the opening at each end thereof, to ensure that the seal means members or tubes do not bind in the conduit means opening, but it is desired that the inner ends of the tubes fit closely within the opening to guide the tubes in their reciprocation and help the O-rings to seal between the tubes and conduit means.

Finally, it is to be observed that the limit of travel of the conduit means toward valve full open position will be effected by engagement of the conduit means with bonnet 154 which forms a stop means engageable with the conduit means.

I claim:
1. A valve comprising
    a hollow body having an inlet and an outlet,
    first seat means disposed between said inlet and outlet and separating same with respect to fluid flow through said valve between said inlet and said outlet except for a passage through said valve seat means,
    said first seat means including a first planar surface around said passage,
    said valve body including a second seat means on the inlet side of said first seat means providing a second planar surface facing and parallel to said first planar surface, closure means cooperable with said seat means to prevent fluid flow through said passage and movable between a closed position preventing fluid passage through the valve, and an open position allowing fluid passage through the valve, said closure means comprising conduit means on the upstream side of said first seat means and having one end adjacent said first planar surface, said one end in valve closed position surrounding said passage through said first seat means, said conduit means having another end adjacent said second planar surface, said closure means including sealing means sealing said ends of said conduit means to said seat means in valve-closed position, said passage through said first seat means being in communication with the interior of the valve body on the upstream side of the seat exterior to said conduit means when said closure means is in valve open position, actuator means for moving said closure means parallel to said planar surfaces between said open and closed positions, said conduit means having an opening therethrough and said sealing means each comprising a seal member reciprocatably, sealingly, mounted in an end of said opening for movement between positions protruding from said opening to greater and lesser extents, each said seal member having a port therethrough communicating at one end with the respective one of said seat means and at the other end with said opening, thereby placing said seat means in communication with each other through said conduit means; and, when the valve closure is in valve-closed position, a first of one of said seal members which is included in the one of said sealing means that engages the planar surface of the first said seat means sealing around said passage therethrough with said port in said first seal member communicating with said passage through said first seat means, said first seal member not sealing around said passage in said first seat means when said closure means is in valve open position, the first said seat means comprising a plug sealingly received in a hole through said valve body and having a port therethrough, said valve body including a main portion having a planar surface on the exterior thereof around said hole in the body, and a connector portion having a planar surface adjacent the planar surface of the main portion of the body, said connector portion being fastened to said main portion of the body, said connector portion including said outlet, said outlet being in communication with the port in said plug, the diameter of said outlet adjacent said hole being smaller than said opening and said plug having a planar end surface abutting said planar surface of said connector portion, the opening at the end of said port in said plug adjacent said seal member being asymmetric relative to the cylindric outer periphery of said plug, and alignment means extending between said plug and connector portion and positioning said plug in predetermined azimuthal relationship to said valve body with respect to the axis of said plug.

2. Valve according to claim 1 wherein each of said seal members has an annular bead on its end adjacent the respective seat means, said bead extending around the port in the seal member and sealingly engaging the planar face of the seat means.

3. Valve according to claim 1, wherein the second said seat means comprises a plug sealing secured in a hole in said valve body.

4. Valve according to claim 3 said valve body main portion having a second planar surface on the exterior thereof around the last said hole in the body, and a blanking portion having a planar surface adjacent the last said planar surface of the main portion of the body, said blanking portion being fastened to said main portion of the body, and said plug of said second seal means having a planar end surface abutting said planar surface of said blanking portion.

5. A valve comprising a hollow body having an inlet and an outlet, first seat means disposed between said inlet and outlet and separating same with respect to fluid flow through said valve between said inlet and said outlet except for a passage through said valve seat means, said first seat means including a first planar surface around said passage, said valve body including a second seat means on the inlet side of said first seat means providing a second planar surface facing and parallel to said first planar surface, closure means cooperable with said seat means to prevent fluid flow through said passage and movable between a closed position preventing fluid passage through the valve and an open position allowing fluid passage through the valve, said closure means comprising conduit means on the upstream side of said first seat means and having one end adjacent said first planar surface, said one end in valve-closed position surrounding said passage through said first seat means, said conduit means having another end adjacent said second planar surface, said closure means including sealing means sealing said ends of said conduit means to said seat means in valve-closed position, said passage through said first seat means being in communication with the interior of the valve body on the upstream side of the seat exterior to said conduit means when said closure means is in valve open position, and actuator means for moving said closure means parallel to said planar surfaces between said open and closed positions, said conduit means having an opening therethrough and said sealing means each comprising a seal member reciprocatably, sealingly, mounted in an end of said opening for movement between positions protruding from said opening to greater and lesser extents, each said seal member having a port therethrough communicating at one end with the respective one of said seat means and at the other end with said opening, thereby placing said seat means in communication with each other through said conduit means; and, when the valve closure is in valve closed position, a first of one of said seal members which is included in the one of said sealing means that engages the planar surface of the first said seat means sealing around said passage therethrough with said port in said first seal member communicating with said passage through said first seat means, said first seal member not sealing around said passage in said first seat means when said closure means is in valve open position, the first said seat means comprising a plug sealingly received in a hole through said valve body and having a port therethrough, the second said seat means comprising a plug sealingly secured in a hole in said valve body, said plug of said second seat means being blind.

6. A valve comprising a hollow body having an inlet and an outlet, first seat means disposed between said inlet and outlet and separating same with respect to fluid flow through said valve between said inlet and said outlet except for a passage through said valve seat means, said first seat means including a first planar surface around said passage, said valve body including a second seat means on the inlet side of said first seat means providing a second planar surface facing and parallel to said first planar surface, closure means cooperable with said seat means to prevent fluid flow through said passage and movable between a closed position preventing fluid passage through the valve and an open position allowing fluid passage through the valve, said closure means comprising conduit means on the upstream side of said first seat means and having one end adjacent said first planar surface, said one end in valve-closed position surrounding said passage through said first seat means, said conduit means having another end adjacent said second planar surface, said closure means including sealing means sealing said ends of said conduit means to said seat means in valve-closed position, said passage through said first seat means being in communication with the interior of the valve body on the upstream side of the seat exterior to said conduit means when said closure means is in valve open position, and actuator means for moving said closure means parallel to said planar surfaces between said open and closed positions, said conduit means having an opening therethrough and said sealing means each comprising a seal member reciprocatably, sealingly, mounted in an end of said opening for movement between positions protruding from said opening to greater and lesser extents, each said seal member having a port therethrough communicating at one end with the respective one of said seat means and at the other end with said opening, thereby placing said seat means in communication with each other through said conduit means; and, when the valve closure is in valve-closed position, a first one of said seal members which is included in the one of said sealing means that engages the planar surface of the first said seat means sealing around said passage therethrough with said port in said first seal member communicating with said passage through said first seat means, said first seal member not sealing around said passage in said first seat means when said closure means is in valve open position, the first said seat means comprising a plug sealingly received in a hole through said valve body and having a port therethrough, the said plug of said second seat means having a recess therein communicating with the said port in the adjacent seal member when the closure means is in valve-closed position.

7. A valve comprising a hollow body having an inlet and an outlet, first seat means disposed between said inlet and outlet and separating same with respect to fluid flow through said valve between said inlet and said outlet except for a passage through said valve seat means, said first seat means including a first planar surface around said passage, said valve body including a second seat means on the inlet side of said first seat means providing a second planar surface facing and parallel to said first planar surface, closure means cooperable with said seat means to prevent fluid flow through said passage and movable between a closed position preventing fluid passage through the valve and an open position allowing fluid passage through the valve, said closure means comprising conduit means on the upstream side of said first seat means and having one end adjacent said first planar surface, said one end in valve closed position surrounding said passage through said first seat means, said conduit means having another end adjacent said second planar surface, said closure means including sealing means sealing said ends of said conduit means to said seat means in valve-closed position, said passage through said first seat means being in communication with the interior of the valve body on the upstream side of the seat exterior to said conduit means when said closure means is in valve open position, and actuator means for moving said closure means parallel to said planar surfaces between said open and closed positions, said conduit means having an opening therethrough and said sealing means each comprising a seal member reciprocatably, sealingly, mounted in an end of said opening for movement between positions protruding from said opening to greater and lesser extents, each said seal member having a port therethrough communicating at one end with the respective one of said seat means and at the other end with said opening, thereby placing said seat means in communication with each other through said conduit means; and, when the valve closure is in valve-closed position, a first of one of said seal members which is included in the one of said sealing means that engages the planar surface of the first said seat means sealing around said passage therethrough with said port in said first seal member communicating with said passage through said first seat means, said first seal member not sealing around said passage in said first seat means when said closure means is in valve open position, the first said seat means comprising a plug sealingly received in a hole through said valve body and having a port therethrough, the second said seat means comprising a plug sealingly secured in a hole in said valve body, said valve body including a main portion having a planar surface on the exterior thereof around each of said holes in the body, and adjacent each of said planar surfaces of the body an outer body portion having a planar surface engaged with the planar surface of the main portion of the valve body, said outer portions being fastened to said main portion of the body, said plugs each having a planar end abutting one of said planar surfaces of said outer portions of the valve body, one of said outer portions being blind and the other including said outlet, which is in communication with said port in the adjacent plug.

8. Valve according to claim 7 wherein each of said seal members has an annular bead on its end adjacent the respective seat means, said bead extending around the port in the seal member and sealing by engaging the planar surface of the seat means and surrounding the port in the seat means when the closure means in in valve-closed position and partially moving off of said planar face when said closure means is in valve part open position.

9. A valve comprising a hollow body having an inlet and an outlet, first seat means disposed between said inlet and outlet and separating same with respect to fluid flow through said valve between said inlet and said outlet except for a passage through said valve seat means, said first seat means including a first planar surface around said passage, said valve body including a second seat means on the inlet side of said first seat means providing a second planar surface facing and parallel to said first planar surface, closure means cooperable with said seat means to prevent fluid flow through said passage and movable between a closed position preventing fluid passage through the valve and an open position allowing fluid passage through the valve, said closure means comprising conduit means on the upstream side of said first seat means and having one end adjacent said first planar surface, said one end in valve-closed position surrounding said passage through said first seat means, said conduit means having another end adjacent said second planar surface, said closure means including sealing means sealing said ends of said conduit means to said seat means in valve-closed position, said passage through said first seat means being in communication with the interior of the valve body on the upstream side of the seat exterior to said conduit means when said closure means is in valve open position, and
actuator means for moving said closure means parallel to said planar surfaces between said open and closed positions,
said actuator means comprising a stem slidably, sealingly, extending through an aperture in said valve body for reciprocation parallel to said planar surfaces and connected within the valve body to said conduit means,
spring means external to the valve body urging said stem inward into said valve body and stop means in said valve body limiting the inward movement of said stem, said stem when at the limit of its inward travel positioning said conduit means in valve-closed position,
said stop means comprising a shoulder around said inlet,
said conduit means overlying said inlet in valve-closed position, and
channel means to admit upstream pressure to the interior of said valve body through said inlet past said conduit when said valve conduit is in valve-closed position overlying said seat.

10. Valve according to claim 9,
said body having a cylindric bore whose axis is parallel to said planar surfaces of said seat means,
said conduit means including cylindric surfaces guided by said bore in said body.

11. Valve according to claim 10,
said conduit means having a cylindric opening therethrough including a central smaller diameter part and terminal larger diameter parts,
said sealing means each including a generally cylindric seal member having a smaller diameter end reciprocatingly sealing mounted in said central part of said opening in said conduit means and a larger diameter end received in a terminal part of said opening in said conduit means.

12. Valve according to claim 11,
said conduit means having flutes on its outer periphery extending vertically through said terminal parts of said opening.